United States Patent Office 2,927,085
Patented Mar. 1, 1960

2,927,085

ALKYLATION PROCESS AND CATALYST THEREFOR

Leon B. Gordon and Truman P. Moote, Jr., Tulsa, Okla., assignors to Pan American Petroleum Corporation, Tulsa, Okla., a corporation of Delaware No Drawing. Application March 27, 1958
Serial No. 724,265

9 Claims. (Cl. 252—428)

The present invention relates to improved alkylation catalysts and to processes in which such catalysts are used. More particularly, it is concerned with highly active alkylation catalysts which make possible the alkylation of aromatic and certain aliphatic hydrocarbons under relatively mild conditions.

Specifically, we have found that certain silicon and tin compounds serve as excellent activators for various known alkylation catalysts to render the latter capable of catalyzing alkylation reactions at temperature levels far below those ordinarily required by said catalysts to effect the desired alkylation reaction. Also, we have found that our activators, when used in combination with a variety of granular solids, not necessarily alkylation catalysts themselves under any known operating conditions, can be made active to catalyze the alkylation of certain aliphatic hydrocarbons and aromatics. Thus, well-known alkylation catalysts, such as silica-alumina, must be employed at temperatures in the range of from about 350° to about 500° C., before alkylation of the aromatic ring can be made to occur. If treated with the activators of our invention, however, we have found that excellent yields can be secured when operating at temperatures ranging from about 25° to about 200°–250° C. Generally, temperatures of from about 75° to about 150° C., specificaly from about 80° to about 130° C., are preferred.

In the alkylation of an aromatic hydrocarbon having a side chain with a primary olefin or with a diolefin, using an alkali metal or alkali metal hydride catalyst, the olefin attaches to the side chain and not to the ring. In contrast, alkylations made using Lewis acid type catalysts results in the olefin attaching itself to the aromatic ring. Examples of catalysts capable of alkylating the aromatic nucleus are aluminum chloride-hydrogen chloride, silicophosphoric acid, silica-alumina (at elevated temperatures, i.e., typically 450° C.), zinc chloride on alumina, and activated hydrosilicates. In all cases where normally solid catalysts are used, conditions are severe and many isomers as well as degradation products result.

It is an object of our invention to provide an alkylation process employing a solid catalyst under mild temperature conditions.

In carrying out our invention, the aliphatic or aromatic hydrocarbon to be alkylated, together with a suitable silicon or tin compound and the finely divided solid, are added to a reaction vessel in an inert atmosphere such as nitrogen, if desired. The order in which the hydrocarbon, silicon or tin compound and finely divided solid are added, as far as we have been able to determine, is unimportant. After these ingredients are well mixed, the alkylating unsaturated hydrocarbon is introduced at atmospheric or elevated pressure. The mixture is heated up to a temperature of from about 50° to about 150° C., preferably 70° to about 130° C., and the reaction continued until the desired degree of alkylation is obtained. If the alkylating agent is in a gaseous state, completion of the reaction may be evidenced by failure of the pressure to drop further.

The products from this reaction are liquids and may be recovered by first cooling the reaction vessel and then water-washing the contents of the flask to decompose the catalyst and allow the decomposition products along with water-soluble impurities to pass into the resulting lower water layer. The upper organic product layer is separated, water-washed and filtered, if necessary, and then dried by means of any of several methods known to the art. The dried product may then be fractionated. Alternatively, the product can be distilled to recover unreacted aromatic hydrocarbon and volatile catalyst components, such as silicon tetrachloride. The residue can be filtered to separate reaction product and less volatile liquid catalyst components from solid.

While we have found that reaction mixtures in the alkylation process, as generally described above, should first be heated to about 50° to 100° C. to initiate the reaction, alkylation will generally proceed spontaneously when a hydrocarbon derivative of boron, an organometallic compound or various metal hydrides, are added to the catalyst. Hydrocarbon derivatives of boron which may be used in practicing our invention, include the alkyl borons and the aryl borons. Examples of such compounds are trimethyl boron, triethyl boron, tributyl boron, tridecyl boron, and the like. Typical of the aryl borons that may be employed are triphenyl boron, tritolyl boron, trixylyl boron, trinaphthyl boron, and the like. As examples of the organometallic compounds used for this purpose, there may be mentioned those derived from metals of groups IA to IIIA and IIB of the Periodic Chart of the Elements. Organometallic compounds derived from the following metals may be used in preparing the catalyst employed in the process of our invention: Li, Na, K, Rb, Be, Mg, Ca, Zn, Al, Ga, In, Tl or mixtures of such derivatives. Typical of these compounds are $NaAl(C_3H_7)H_3$, $Zn(C_2H_5)_2$, $LiC_4H_9$, $C_2H_5MgI$, phenyl magnesium bromide, $C_4H_9ZnI$, $LiAl(C_2H_5)H_3$, organoaluminum compounds such as the trialkylaluminums, the triarylaluminums, preferably the lower molecular weight derivatives, such as triisobutylaluminum, triethylaluminum, triamylaluminum, and the like.

The metal hydrides which may be substituted for the above-mentioned organometallic compounds, comprise the aluminum and borohydrides. Typical examples of these compounds are $NaAlH_4$, $LiBH_4$, $NaBH_4$, $LiAlH_4$, together with complex metal hydrides such as $NaAl(C_3H_7)H_3$ mentioned in the foregoing paragraph.

While the preferred form in which silicon is used in carrying out our invention is the tetrachloride, other tetrahalides such as the tetraiodide and the tetrabromide, may be used. In addition, various hydrocarbon derivatives of silicon may be substituted for the silicon tetrahalides mentioned above. As examples of such derivatives, there may be mentioned dimethyl dibromosilane, dimethyl dichlorosilane, phenyl methyl dichlorosilane, diphenyl dichlorosilane, tetramethyl silane, trimethyl bromosilane, and the like.

While the preferred form in which tin is used in carrying out our invention is the tetrachloride, other tetrahalides such as the tetraiodide and the tetrabromide, may be used. Also, analogous divalent tin compounds are suitable. In addition, various hydrocarbon derivatives of tin may be substituted for the tin halides mentioned above. As examples of such derivatives, there may be mentioned dimethyl dibromostannane, dimethyl dichlorostannane, phenyl methyl dichlorostannane, diphenyl dichlorostannane, tetramethyl stannane, trimethyl bromostannane, tetraphenyl tin, and the like.

The finely divided solid to be used in combination with the silicon or tin compound, may be selected from a wide range of materials coming under the general classification of catalyst carriers. While certain of the materials mentioned below in their own right may be catalysts for alkylation reactions, they do not so function by themselves within the temperature ranges we employ, as will be demonstrated in certain of the examples appearing hereinafter. Therefore, it is considered accurate to designate such substances as carriers, under the circumstances. As examples of such carriers, there may be mentioned titania, zirconia, vanadium pentoxide, activated carbon, various mineral clays, alumina, silica-alumina, silica gel, silica, and the like.

The proportions in which the silicon or tin compound and carrier are employed may cover a relatively wide range of concentrations. In fact, insofar as we have been able to determine, the proportions of the catalyst components employed are not believed to be critical with respect to operability. Typically, the activators and the carriers may be used in respective molar proportions of from 100:1 to 1:100. Ordinarily the preferred ratios may range from about 5:1 to about 1:5, and we have found it particularly advantageous to use molar ratios of about 0.7:1.5. When the above-mentioned organometallic compounds or metal hydrides are used as a third component of the catalyst, said compounds or hydrides generally may be employed in concentrations of from about 200 to about 1 percent and preferably from about 100 to about 15 percent, based on the weight of carrier present.

The quantities of reactants used may be varied over a relatively wide range with good results. For example, from about 1 to about 50 mols of alkylating agent per mol of alkylatable hydrocarbon, may be used. An excess of aromatic hydrocarbon to alkylating agent enhances the formation of monoalkylated product. To produce the monoalkylated material, the mol ratio of alkylating agent to alkylatable hydrocarbon should be about 1:10 and preferably about 1:2 or 3. For dialkylation the ratios should be reversed.

The pressure employed in carrying out our invention may vary widely. Alkylation with the less volatile olefins may be effected at atmospheric pressure, if desired. However, with normally gaseous olefins or with normally gaseous or low boiling isoparaffins, it is generally preferred to use superatmospheric pressure in order to provide an adequate concentration of reactants to contact the catalyst under reaction conditions. In general, alkylation of aromatics and isoparaffins, in accordance with our invention, may be varied from pressures ranging from atmospheric to 500 p.s.i.g. and above.

While our invention may be carried out by bringing into contact the catalyst, alkylating agent and alkylatable hydrocarbon, with one or both of the reactants in the gaseous or vapor phase, we ordinarily prefer that at least one of the reactants be in the liquid phase.

The alkylating agents used in our invention may be selected from a wide variety of compounds. In fact, various of the well-known diolefins have been found to be operative. Examples of these alkylating agents are ethylene, propylene, 1-butene, styrene, alpha methyl styrene, butadiene, the pentadienes such as, for example, isoprene, and the like. Although it is normally desirable to use the alkylating agent in substantially pure form, various mixtures thereof or streams containing various inert diluents along with a suitable alkylating agent, may be employed. For example, the crude product stream from the dehydrogenation of a normally gaseous paraffin hydrocarbon, may be used directly in the process of our invention. Likewise, refinery fractions of ethylene, propylene, 1-butene or mixtures of such fractions, may be used if desired.

As examples of the hydrocarbons that can be alkylated by the use of our invention, there may be mentioned toluene, benzene, ethyl benzene, the xylenes, naphthalene, diphenyl, anthracene, isoparaffins, such as isobutane, isopentane, and the like. Mixtures of these hydrocarbons, of course, may be alkylated by our invention as presently contemplated.

Aromatic hydrocarbons are readily alkylated with primary olefins of the type contemplated herein, in the presence of a catalyst consisting of a silicon compound of the class mentioned above and a carrier at pressures ranging from atmospheric to 50 to 70 p.s.i.g. and at about 150° C. or less. Likewise, within the same pressure range and with an organometallic compound, a hydrocarbon derivative of boron, or a metal hydride of the type mentioned above, but at even lower temperatures, for example, room temperature, alkylation between the above-named alkylating agents and aromatics is initiated. When the alkylating agent is employed in a ratio of about 1 mol for each 2 or 3 mols of aromatic hydrocarbon, the formation of a monoalkylated product is favored. For example, propylene alkylates toluene under such conditions in the presence of a catalyst consisting essentially of silicon tetrachloride, silica-alumina and triisobutylaluminum, to produce a mixture of isomeric cymenes as the principal products. In numerous experiments we have carried out, as much as 90 weight percent of the alkylating agent reacts with the aromatic hydrocarbons in a matter of only a few hours, even at atmospheric pressure.

The process of our invention may be further illustrated by the following specific examples:

*Example 1*

To a 100 ml. pressure-resistant glass flask, under an atmosphere of nitrogen, was added 4 grams of silica-alumina (cracking catalyst grade), 8.9 grams of silicon tetrachloride and 42.3 grams of toluene. The flask was closed and pressured to 50 p.s.i.g. with propylene. There was a temperature rise of 14° C. representing what appeared to be heat generated from solution of propylene in toluene. Heat was applied to raise the temperature up to a range of 80° to about 114° C. When the temperature of the contents of the reaction mixture reached the aforesaid range, a pressure drop was noticeable. After the temperature had reached 124° C., the pressure had dropped to 20 p.s.i.g. from 40 p.s.i.g. at 80° C. Addition of heat was then discontinued and the reaction flask cooled by immersing it in water at intervals. In order to hold the temperature of the reaction mixture at a level of about 120° C., the propylene pressure was maintained at 20 p.s.i.g. instead of 50 p.s.i.g. Under these conditions the liquid volume of the flask rapidly increased and at the end of two hours, it was necessary to discontinue the run because the flask had been completely filled. The flask was next cooled and the reaction mixture washed with water to remove any dissolved catalyst present. On standing, the product in the presence of water rose to the top in the form of an oil layer. This layer was filtered and then dried over calcium hydride. The total liquid recovered from the flask was 89 grams and on distillation of this layer, the following product distribution was determined:

| Component | Weight percent |
| --- | --- |
| toluene | 1 0.0 |
| cymenes | 2.3 |
| diisopropyl toluenes | 16.4 |
| triisopropyl toluenes | 72.1 |
| unknown (residue + loss) | 9.2 |

[1] Infrared analysis of the product also indicated the absence of toluene.

Under procedures substantially identical with that described in Example 1, silicon tetrachloride and silica-alumina were separately tested as alkylation catalysts and were found to be inactive under such conditions. Likewise tin tetrachloride by itself is non-catalytic under these conditions.

Example 2

To a 100 ml. pressure flask under an atmosphere of nitrogen, was added 1 gram of silica-alumina, 46.7 grams of toluene and 1.3 grams of silicon tetrachloride. Propylene was added and the reaction carried out at 50 to 70 p.s.i.g. and at temperatures ranging from 50° to 90° C. for a period of one and a half hours. After working up the reaction mixture in accordance with the procedure described in Example 1, a total of 12 grams of product was recovered, 1.6 grams of which was a higher boiling alkylation product of undetermined structure, while 10.4 grams of a mixture of cymenes was obtained. The ratio of ortho, meta and para cymenes in this reaction was determined to be as follows: ortho, 37.3 percent; meta, 23.7 percent; and para, 39.0 percent.

Example 3

In accordance with the procedure set forth in Example 1, 47.8 grams of toluene was alkylated with 1-butene under a pressure of approximately 30 p.s.i.g. in the presence of a catalyst containing 1.5 grams of silicon tetrachloride, 1 gram of silica-alumina and 0.9 gram of triisobutylaluminum. The reaction was initiated at room temperature and the maximum temperature registered was 77° C. After 16.5 hours, the vessel was cooled and the reaction mixture amounting to a total of 77 grams, after being recovered in accordance with Example 1, was fractionated with a Podbielniak Whirling Band column. The following data indicate the nature and amounts of the various fractions obtained:

| Fractions [1] | Overhead temperature, °C. | Pressure, mm. Hg | Weight, grams |
|---|---|---|---|
| 1-5, 20-24 | 87.5-103.8 | 743 | 11.24 |
| 6-19, 25-43 | [2] 103.0-110.3 | 743 | 42.59 |
| Residue | | | 16.10 |
| Unaccounted for (loss) | | | 7.07 |

[1] The distillation kettle was of such size that the sample was added in two portions.
[2] The kettle temperature was 200° C.

Molecular weight values for the residue were 129 and 142 (average 137) by freezing point depression. The molecular weight of butyltoluene is 148. The residue had a bromine number of 13 and by fluorescent indicator adsorption, contained approximately 7 percent olefin and 93 percent aromatic hydrocarbons. The product (16.1 grams) obtained, as determined by infrared analysis, consisted primarily of isomeric butyltoluenes.

Example 4

1-pentene was reacted with 38.7 grams of toluene in an approximately stoichiometric amount in the presence of a catalyst consisting of 3.0 grams of silicon tetrachloride, 2 grams of silica-alumina and 0.9 gram of triisobutylaluminum. As in Example 3, reaction was initiated at room temperature. The maximum temperature obtained during the twenty hour reaction period, was 73° C. In this particular run, the reaction vessel was merely plugged after the 1-pentene had been added and hence no pressure determinations were made. At the end of the above-mentioned reaction period, the product phase was separated from the catalyst and fractionated in accordance with the procedure of Example 3. Infrared analysis of the product obtained indicated that alkylated toluenes had been produced.

Example 5

In accordance with the procedure set out in Example 1, 48.4 grams of benzene were reacted with propylene under a pressure of 70 p.s.i.g. and in the presence of a catalyst consisting of 9.0 grams of silicon tetrachloride and 4.0 grams of silica-alumina. Reaction was initiated by heating the mixture up to about 85° C. During the half-hour reaction period, a maximum temperature of 134° C. was recorded. At the end of this time, the catalyst was separated from the hydrocarbon phase by washing with water and thereafter the product was subjected to infrared analysis which showed the presence of cumene and diisopropyl benzene.

Example 6

In accordance with the procedure set out in Example 1, 48.4 grams of toluene were reacted with propylene under a pressure of 57 p.s.i.g. and in the presence of a catalyst consisting of 9.0 grams of silicon tetrachloride and 4 grams of silica gel. Reaction was initiated by heating the mixture up to about 85° C. and during the half-hour reaction period, a maximum temperature of 132° C. was recorded. After water-washing the product, the latter was dried and subjected to infrared analysis, which method indicated cymenes to be present.

Example 7

In accordance with the procedure set out in Example 1, 48.4 grams of toluene were reacted with propylene under a pressure of 60 p.s.i.g. and in the presence of a catalyst consisting if 9.0 grams of silicon tetrachloride and 4 grams of activated carbon. Reaction was initiated by heating the mixture up to about 85° C. and during the half-hour reaction period, a maximum temperature of 132° C. was recorded. After water-washing the product, the latter was dried and subjected to infrared analysis, which method indicated cymenes to be present.

Example 8

To a flask containing 1147 grams of toluene, was added a mixture of 46.4 grams of silicon tetrachloride and 27 grams of silica-alumina. Thereafter, a total of 216 grams of butadiene was introduced, at about 1 p.s.i.g. into the flask and dissolved by the toluene. The flask was heated slowly at atmospheric pressure. Even at 35° C., 70 percent of the butadiene was alkylating. At 100° C., there was almost 100 percent uptake of butadiene. The reaction was continued for 4.8 hours, with a maximum temperature of 115° C. being recorded during that period. Thereafter, the flask and the contents thereof were cooled and the reaction mixture poured into water in order to separate the catalyst from the crude product. A total of 498 grams of alkylated product was obtained. Of this material, 166 grams were found to be a mono-alkenylated toluene consisting of the ortho, meta and para isomers. Conversion of the butadiene under these conditions was 96.8 percent. On heating the mono-alkenylated product in the presence of this catalyst, a viscous yellow oil having a molecular weight ranging from 223 to about 430, was produced. Heat alone did not produce this polymer.

Example 9

A mixture consisting of 6 grams of dimethyl dichlorosilane and 4 grams of silica-alumina, was added to a 100 ml. flask containing 43 grams of toluene. Propylene was then added in an amount sufficient to produce a pressure of 65 p.s.i.g. The flask was heated up to about 134° C. Reaction was continued for a total of sixteen hours. At the end of this time the flask pressure was about 40 p.s.i.g. The product was then recovered in the manner previously described. Infrared analysis of the liquid material, showed the presence of toluene and ortho, meta and para cymenes.

Example 10

A mixture consisting of 1 gram of lithium aluminum hydride, 4 grams of silica-alumina and 6 grams of silicon tetrachloride, was added to a 100 ml. flask containing 43 grams of toluene. Propylene was then added in an amount sufficient to produce a pressure of 70 p.s.i.g. The flask was heated up to about 84° C., at which point reaction began to occur with a temperature rise up to about 130° C. Reaction was continued for a total period of two hours. At the end of this time the flask pressure was about 40 p.s.i.g. The product was then recovered in the manner previously described. Infrared analysis of the liquid material, showed the presence of toluene and ortho, meta and para cymenes.

*Example 11*

A mixture of 2 grams of sodium borohydride, 3 grams of silicon tetrachloride, 2 grams of silica-alumina and 30 grams of toluene, was prepared and allowed to stand at room temperature for seventy-two hours. Thereafter, the mixture was placed in a 100 ml. glass flask and subjected to a propylene pressure of 50 p.s.i.g. Initially, reaction occurred at about 31° C. and increased rather rapidly up to about 71° C. Thereafter, heat was added to increase the temperature to about 130° C. The reaction was allowed to continue for a period of about twenty hours, during which time a maximum temperature of 172° C. was reached. Thereafter, the vessel was cooled and the crude reaction product, which amounted to 60 grams, was fractionated with a Podbielniak Whirling Band column. A total of 54.5 grams of overhead material and 5.5 grams of kettle residue was recovered. The overhead product contained no toluene, 4 grams of cymenes and the remainder boiled at an overhead temperature range corresponding to the overhead boiling point of di- and triisopropyl-toluene.

*Example 12*

A mixture consisting of 4 grams of vanadium pentoxide (technical grade) and 8.8 grams of silicon tetrachloride, was heated at a temperature of 65° to 70° C. for one hour. Thereafter, the mixture was added to 43 grams of toluene in a 100 ml. flask. Propylene was next introduced in an amount sufficient to produce an initial pressure of 78 p.s.i.g. The flask was slowly heated to a temperature of about 80° C., at which point there was a rapid temperature rise to 100° C. Over a reaction period of one hour, a maximum temperature of 152° C. was recorded. At the end of this time, the pressure had decreased to 50 p.s.i.g. The reaction product was then recovered and subjected to infrared analysis, which indicated the presence of ortho, meta and para cymenes.

*Example 13*

To a 250 ml. steel bomb containing 85 grams of benzene, was added 4.5 grams of silicon tetrachloride and 2 grams of silica-alumina. Sufficient ethylene was then introduced to produce an initial pressure of 800 p.s.i.g. at room temperature. Reaction was initiated and over approximately three hours of a six-hour reaction period, the temperature remained below 100° C. The system had to be depressured at intervals in order to maintain the reaction at a pressure below 2,000 p.s.i.g. The maximum temperature observed during the reaction period was 190° C. At the conclusion of the run, the bomb was depressured, the reaction mixture cooled and the product worked-up as before. Infrared analysis showed the presence of benzene and ethyl benzene, together with a trace of diethyl benzene.

*Example 14*

A mixture consisting of 8.8 grams of tin tetrachloride and 4.0 grams of vanadium pentoxide, was stirred at a temperature of 60° to 70° C. for one hour and twenty minutes. Thereafter, these materials were added to a 100 ml. pressure-resistant glass flask containing 43 grams of toluene. Propylene was next introduced to produce a pressure of approximately 50 p.s.i.g. The reaction mixture was then heated up to a temperature of about 100° C., whereupon reaction was initiated. The run was continued for a period of nineteen hours during which time a maximum temperature of 130° C. was recorded. At the end of the reaction period, the flask was cooled and the contents washed with water to remove any dissolved catalyst present. On standing in the presence of water, the product rose to the top in the form of an oil layer. After filtering and drying over calcium hydride, the crude material was distilled to yield an overhead which, on infrared analysis, indicated the presence of ortho, meta and para cymenes, as well as traces of toluene.

*Example 15*

A mixture consisting of 2.6 grams of tin tetrachloride and 1 gram of vanadium pentoxide, was heated for one hour at 68° C., after which it, together with 0.5 gram of lithium aluminum hydride, was added to a 100 ml. glass flask containing 43 grams of toluene. Thereafter, 18 grams of 1-pentene were added and the reaction mixture slowly heated up to 58° C. during a fifteen-minute interval. At this temperature there was a sudden temperature and pressure rise to 200° C. and 115 p.s.i.g. This change occurred over a seven-minute period. The run was discontinued after ten additional minutes when the temperature had decreased to 83° C. The product was worked up and recovered as before. Infrared analysis showed the presence of ortho, meta and para alkylated toluenes.

The foregoing example illustrates the activating or promoting effect exhibited by the third component of our catalyst system, i.e., the organometallic compound, the complex alkali metal hydride or the hydrocarbon derivative of boron. This fact may be seen when the reaction conditions employed in Examples 14 and 15 are compared. Thus, in Example 14, it is seen that the reaction mixture had to be heated to a temperature of about 100° C. before reaction was initiated, whereas in the case of Example 15, the reaction was initiated at 58° C. and then, after a short time, spontaneously increased to 200° C.

*Example 16*

A mixture of 2 grams of silica-alumina, 6.7 grams of tin tetrachloride and 3 grams of ethyl magnesium bromide (minus ether) was added to a 100 ml. flask containing 20 grams of benzene. To this mixture was next added sufficient butadiene to produce a pressure of 15 p.s.i.g. The temperature spontaneously rose to 68° C. from 26° C. over a period of eighteen minutes. External heat was then applied to increase the temperature to 90° C. The reaction was then allowed to proceed for a total period of one hour. After the product was recovered, infrared anlysis showed the presence of both butenyl benzene and a butadiene polymer with a terminal double bond.

*Example 17*

A mixture of 2.6 grams of tin tetrachloride and 0.8 gram of silica-alumina was added to a 100 ml. flask containing 43 grams of toluene. The flask was next pressured with propylene up to 50 p.s.i.g. Thereafter, the reaction mixture was slowly heated up to about 100° C. at which temperature level propylene absorption was observed to occur. The temperature then increased to 132° C., during which time propylene was rapidly absorbed. After a reaction period of two hours, the run was discontinued and a water-white product recovered in accordance with the procedure described in Example 14. Infrared analysis showed that the alkylated material consisted chiefly of ortho and para cymenes.

*Example 18*

In this run the same quantities of tin tetrachloride, silica-alumina and toluene were employed as in Example 17. However, to this mixture was added 0.5 gram of triisobutylaluminum. After addition of sufficient propylene to produce a pressure of 30 p.s.i.g., the temperature of the reaction mixture rose from 30° to 124° C. in two minutes, with a maximum temperature of 138° C. being recorded over the total reaction period of eleven minutes. Analysis of the product showed it to consist predominantly of ortho, and para cymenes.

Examples 16 and 18, when compared with the results obtained in Example 17, illustrate further the activating effect possessed by the addition of a third component of the class of compounds taught herein. As disclosed, when such materials are added to a catalyst comprising essentially a tin compound and a carrier material, the alkylation process generally occurs with the addition of little or no heat.

*Example 19*

A mixture consisting of 4 grams of stannous chloride, 4 grams of silica-alumina, 2 grams of triisobutylaluminum and 43 grams of toluene, was added to a 100 ml. glass flask and subjected to a propylene pressure of 73 p.s.i.g. The reaction was continued for three hours, during which time the maximum temperature was 130° C. Thereafter, the reaction mixture was cooled and the contents washed with water. The product was recovered and when subjected to infrared analysis, was shown to contain cymenes.

*Example 20*

To a 100 ml. pressure flask containing 30 grams of naphthalene dissolved in 28 grams of heptane, was added 4 grams of silica-alumina and 8.8 grams of tin tetrachloride. On addition of the latter, the mixture turned a distinct yellow color. Propylene was next introduced to produce an initial pressure of 50 p.s.i.g., after which the contents of the flask were heated to a temperature of about 100° C. At this temperature reaction was initiated and was permitted to continue over a period of half an hour. The absorption of propylene at 100° C. was quite rapid with the heat of reaction producing a maximum temperature of 132° C. The product was then worked-up and recovered in the manner generally outlined in Example 14. Infrared analysis of the distillate thus produced, showed that alkylated naphthalenes were present.

*Example 21*

A mixture of 4 grams of activated carbon and 8.9 grams of tin tetrachloride was added to a 100 ml. glass flask containing 43 grams of toluene. Propylene was then introduced in a quantity sufficient to produce a pressure of 50 p.s.i.g. This step was accompanied by approximately a 15° C. temperature rise resulting from the heat of the solution of the propylene in the mixture. Heat was then applied to increase the temperature of the reaction mixture up to about 120° C., at which point a pressure drop was noted indicating that reaction was occurring. Thereafter, the temperature increased to a maximum of 143° C. over a reaction period of half an hour. After the reaction was discontinued, the alkylation product was recovered and isolated in the usual way. Infrared analysis indicated the presence of ortho and para cymenes.

The expression "unsaturated hydrocarbon," as used herein, is intended to refer to both mono- and diolefinic hydrocarbons.

While the compositions generally discussed in the foregoing description all function as alkylation catalysts, we ordinarily prefer those in which the carrier employed is either silica-alumina or vanadium pentoxide and the silicon or tin compound is employed in the form of the tetrachloride. Where such catalysts are further activated with a third component, we generally prefer the latter to be an organometallic compound such as a trialkylaluminum, for example, triisobutylaluminum.

Although we have shown that our catalysts which contain either tin or silicon compounds, function as alkylation catalysts, these two classes of catalyst cannot necessarily be considered as absolute equivalents owing to the tendency of various tin-containing catalysts to function simultaneously as alkylation and polymerization catalysts. We have found this to be true to some extent in cases where a diolefin is employed as the alkylating agent.

We claim:

1. In a process for the alkylation of hydrocarbons, the improvement which comprises contacting an alkylatable hydrocarbon with an unsaturated hydrocarbon and applying sufficient heat to the resulting mixture to bring the temperature of the latter up to a level of about 50° to about 130° C. in the presence of a catalyst having as its essential components a carrier and a halide of silicon.

2. The process of claim 1 in which the alkylatable hydrocarbon is an aromatic hydrocarbon.

3. An alkylation catalyst having as its essential components a carrier and a compound selected from the group consisting of a silicon halide, and a hydrocarbon derivative of silicon.

4. An alkylation catalyst having as its essential components silicon tetrachloride and a carrier.

5. The catalyst of claim 3 in which the silicon halide is silicon tetrachloride.

6. The catalyst of claim 3 in which the carrier is silica-alumina.

7. The catalyst of claim 3 in which the carrier is vanadium pentoxide.

8. The catalyst of claim 3 in which the carrier is silica gel.

9. The catalyst of claim 3 in which the carrier is activated carbon.

References Cited in the file of this patent

UNITED STATES PATENTS

| | | |
|---|---|---|
| 2,292,708 | Mavity | Aug. 11, 1942 |
| 2,441,214 | Thomas et al. | May 11, 1948 |
| 2,406,869 | Upham | Sept. 3, 1946 |
| 2,771,495 | Pines et al. | Nov. 20, 1956 |
| 2,780,660 | Field et al. | Feb. 5, 1957 |

OTHER REFERENCES

Calloway, Chemical Reviews, vol. 17, 1935, p. 375 only relied on.